(12) United States Patent
Takahashi et al.

(10) Patent No.: US 7,961,677 B2
(45) Date of Patent: Jun. 14, 2011

(54) WIRELESS BASE STATION, MOBILE STATION, RADIO COMMUNICATION SYSTEM, AND RADIO COMMUNICATION METHOD

(75) Inventors: Hideaki Takahashi, Yokohama (JP);
Noriyuki Maeda, Yokohama (JP);
Shunji Miura, Yokohama (JP);
Hiromitsu Asakura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 693 days.

(21) Appl. No.: 12/062,111

(22) Filed: Apr. 3, 2008

(65) Prior Publication Data
US 2008/0247356 A1 Oct. 9, 2008

(30) Foreign Application Priority Data

Apr. 4, 2007 (JP) ............... P2007-098664
Dec. 28, 2007 (JP) ............... P2007-340705

(51) Int. Cl.
| | |
|---|---|
| H04W 4/00 | (2009.01) |
| H04W 72/00 | (2009.01) |
| H04B 7/208 | (2006.01) |
| H04L 12/56 | (2006.01) |
| H03D 1/04 | (2006.01) |

(52) U.S. Cl. ........ 370/329; 370/341; 370/344; 370/431; 375/346; 455/450

(58) Field of Classification Search .......... 370/310–350, 370/431–437, 478–485; 455/419–431, 446–455; 375/130–149, 346–349
See application file for complete search history.

(56) References Cited

U.S. PATENT DOCUMENTS
7,257,410 B2 * 8/2007 Chun et al. ............... 455/455
(Continued)

FOREIGN PATENT DOCUMENTS
| | | |
|---|---|---|
| EP | 1978691 A2 * | 10/2008 |
| JP | 2005-80286 | 3/2005 |
| KR | 10-2007-0029023 | 3/2007 |
| WO | WO 2007/035302 A1 | 3/2007 |

OTHER PUBLICATIONS

"IEEE Standard for Local and Metropolitan area networks, Part 16: Air Interface for Fixed and Mobile Broadband Wireless Access Systems, Amendment 2: Physical and Medium Access Control Layers for Combined Fixed and Mobile Operation in Licensed Bands, 8.4. 6.1.2", IEEE Standard 802.16e-2005, IEEE, Feb. 28, 2006, 14 pgs.
(Continued)

*Primary Examiner* — Tri H Phan
(74) *Attorney, Agent, or Firm* — Oblon, Spivak, McClelland, Maier & Neustadt, L.L.P.

(57) ABSTRACT

The object of the present invention is to achieve reduction of interference between cells and improvement of maximum throughput so as to improve spectrum efficiency. A wireless base station which transmits a radio signal between itself and a plurality of mobile stations by means of OFDMA includes: a multiplexing part for generating user data; a channel assignment control part for selecting a plurality sets of sub-carriers among a plurality of sub-carriers so as to constitute a radio frame containing sub-channels assigned to each of the plurality sets of sub-carriers and for setting in the radio frame the user data and control data by means of orthogonal frequency division multiplexing; and a transmission part for transmitting a radio signal containing the radio frame; where, the channel assignment control part is constituted so that the radio frame is divided into 2 zones for the control and user data and all the sub-channels in the zone for control data are divided into groups for each of sectors; the control data is allocated on the corresponding divided groups; and the user data is allocated on all the sub-channels in the zone for user data.

10 Claims, 16 Drawing Sheets

U.S. PATENT DOCUMENTS

2007/0058592 A1   3/2007   Kim et al.
2008/0031190 A1*  2/2008   Bae et al. ............... 370/329
2008/0165734 A1*  7/2008   Hart et al. .............. 370/330
2010/0040080 A1*  2/2010   Um et al. ............... 370/437
2010/0272210 A1* 10/2010   Kwon et al. ............ 375/295

OTHER PUBLICATIONS

"IEEE Standard for Local and Metropolitan area networks, Part 16: Air Interface for Fixed Broadband Wireless Access Systems, 8.4.6.1.2", IEEE Standard 802.16-2004, IEEE, Oct. 1, 2004, 7 pgs.

* cited by examiner

Fig.3
(a)
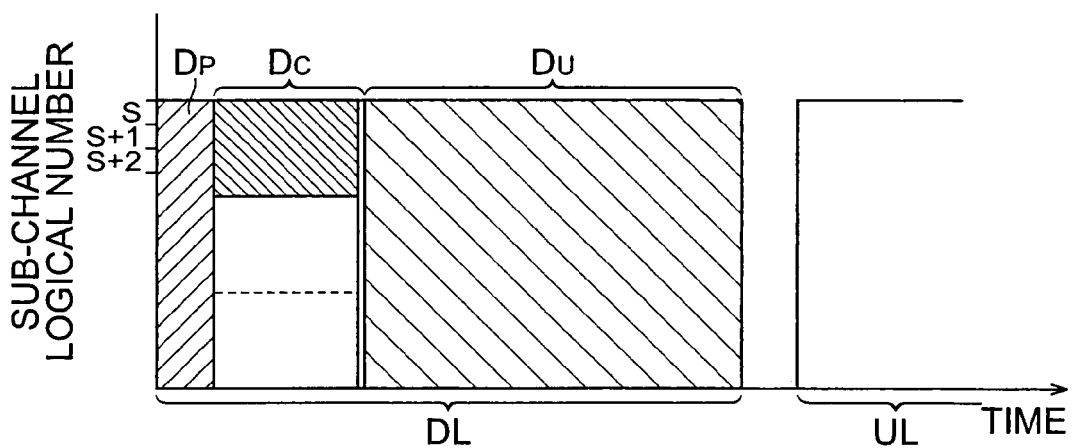
(b)
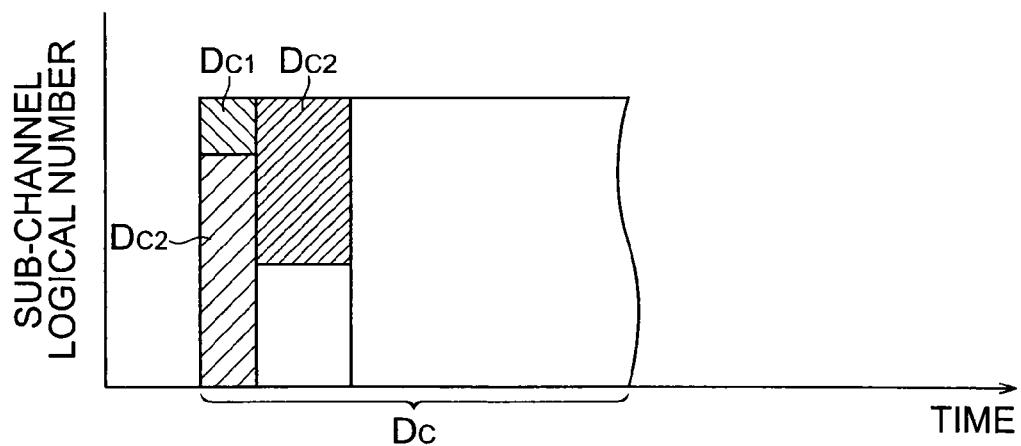

Fig.6

| ITEM | DATA SIZE [bit] | DATA CONTENT |
|---|---|---|
| ⋮ | ⋮ | ⋮ |
| Extended DIUC | 4 | 0×01 |
| Length | 4 | 0×04 |
| OFDMA symbol offset | 8 | |
| Permutation | 2 | 0b00,0b01 0b10,0b11 |
| Use All SC indicator | 1 | 1 |
| ⋮ | ⋮ | ⋮ |

Fig.12
(a)
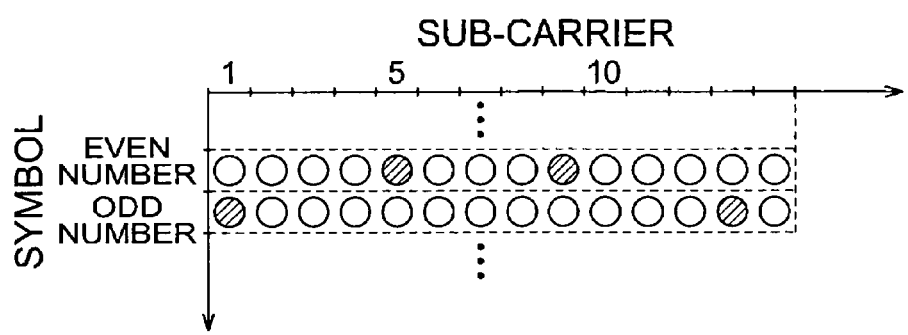
(b)
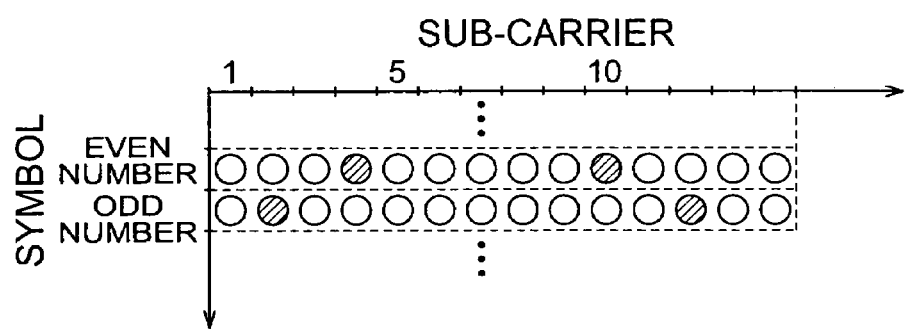
(c)
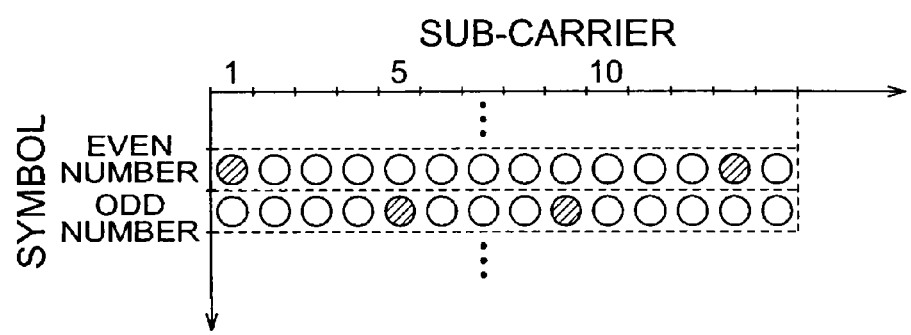

Fig.13
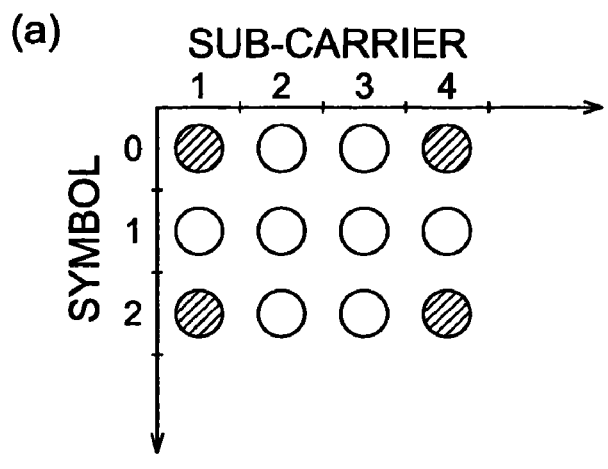
(a)
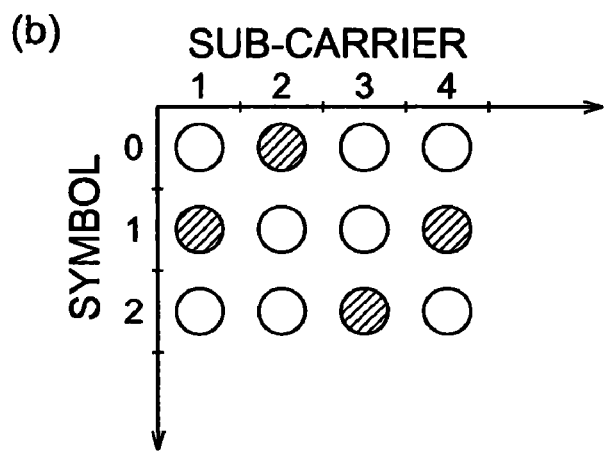
(b)
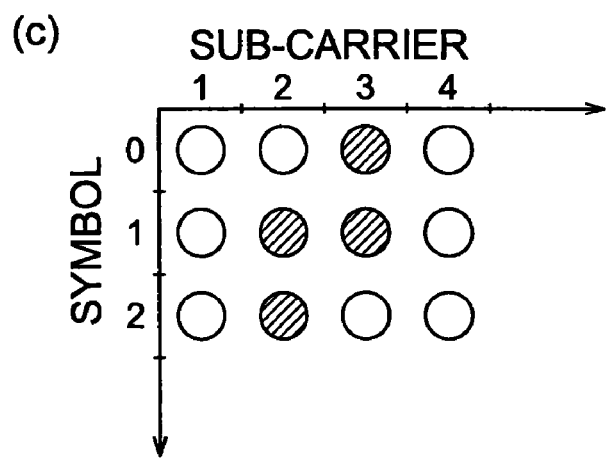
(c)

Fig.14
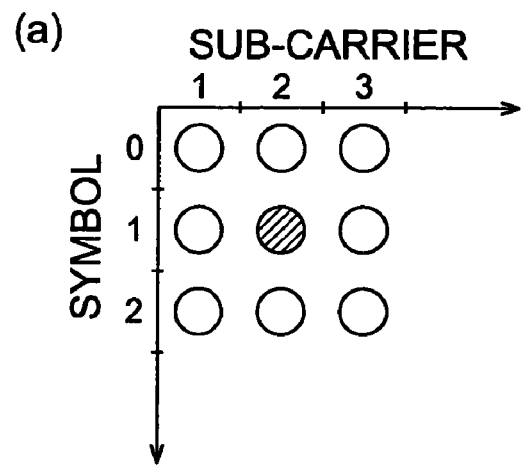
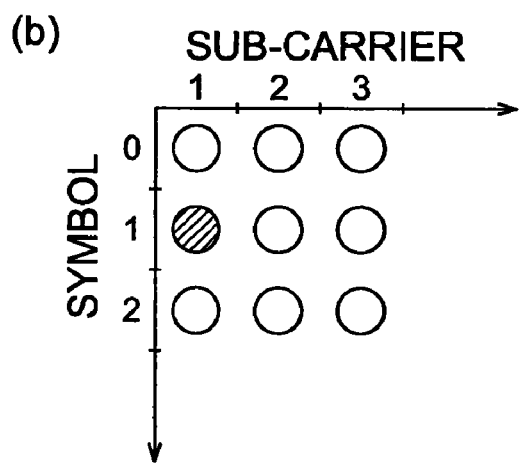
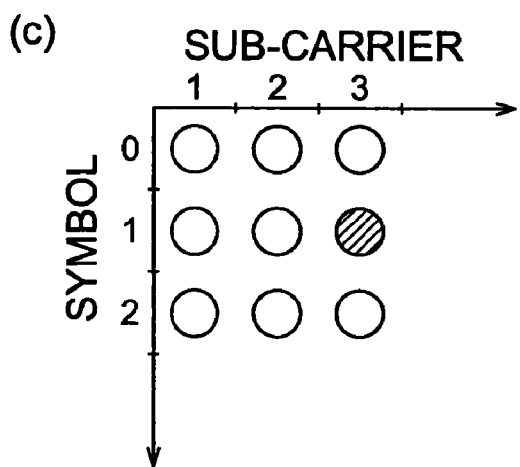

Fig.15
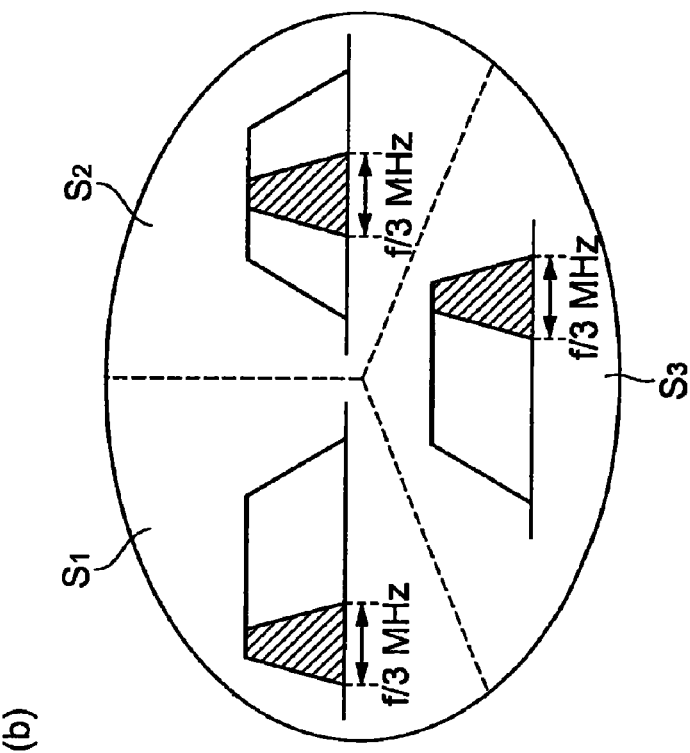
(a)
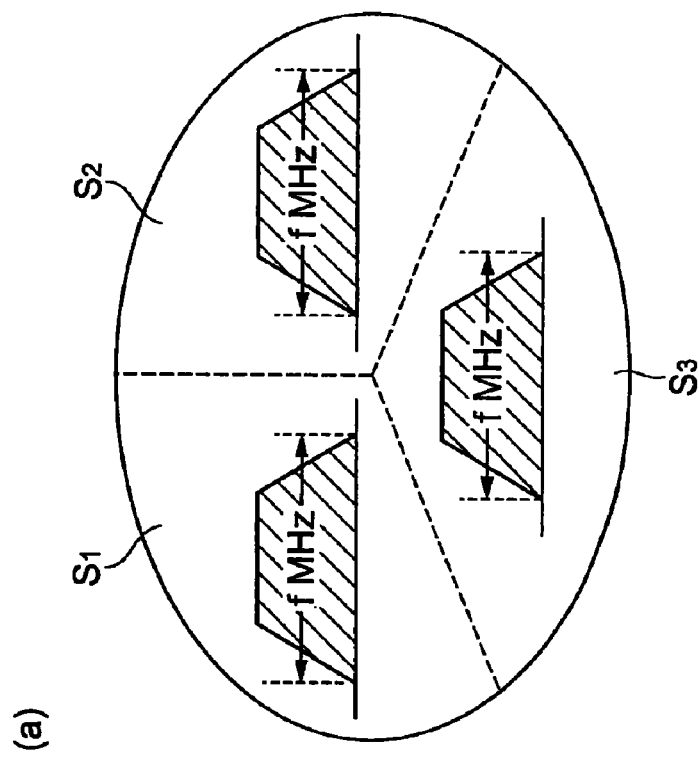
(b)

WIRELESS BASE STATION, MOBILE STATION, RADIO COMMUNICATION SYSTEM, AND RADIO COMMUNICATION METHOD

BACKGROUND OF THE INVENTION

1. Field of the Invention

The present invention relates to a wireless base station, a mobile station, a radio communication system, and a radio communication method.

2. Related Background of the Invention

A mobile communication system using OFDMA (Orthogonal Frequency Division Multiple Access) which realizes multiple access between a wireless base station and a mobile station by dividing a carrier signal into a plurality of orthogonal sub-carriers, have been known. Details of the communication scheme are described in the following Non-Patent Document 1. As a channel assignment scheme in the mobile communication system using OFDMA, two schemes illustrated in FIGS. 15A and 15B are included. In the scheme illustrated in FIG. 15A, sub-carriers having the same frequency band are assigned to sectors $S_1$, $S_2$ and $S_3$ in one wireless base station, respectively, and in the scheme illustrated in FIG. 15B, frequency band is logically divided into three segments, and sub-carriers belonging to each of the divided segments are assigned to the neighboring sectors $S_1$, $S_2$ and $S_3$, respectively.

Moreover a channel assignment scheme has been disclosed, where a cell $C_1$ corresponding to one base station are divided into two areas of an outer area $A_1$ and an inner area $A_2$, and to the inner area $A_2$ having few interference with other cells, all transmittable sub-carriers are assigned, and to the outer area $A_1$ having much interference with other cells, segment divided parts of sub-carriers are assigned (refer to the following Patent Document 1 and FIG. 16).

Patent Document 1: Japanese Patent Application Laid-open No. 2005-80286

Non-Patent Document 1: "IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1", IEEE Std, February 2006

SUMMARY OF THE INVENTION

Among the above mentioned schemes, in the scheme where sub-carriers having the same frequency band are assigned to each of the sectors, the maximum throughput can be improved because all transmittable bands are used, but at the same time, interference between neighboring cells is large, thereby, communication quality at the cell edge tends to be degraded. On the other hand, although the scheme where a frequency band is divided into segments, has an advantage that the communication quality at the cell edge can be improved by means of small interference between neighboring cells, the maximum throughput tends to be reduced. In particular, when OFDMA based on IEEE802.16e is used, data lengths of DL-MAP and UL-MAP that are control signals in a radio frame increase in proportion to the number of users of a mobile station, thereby, as the number of users increases, the problem of reduction of the throughput will be remarkable.

Moreover, although the assignment scheme described in Patent Document 1 mentioned above, has a purpose to prevent the throughput from reducing by assigning all the frequency bands in the inner area, since it is necessary for the assignment system to divide a user data part in a radio frame into two parts in terms of time, i.e. the outer area and the inner area of a cell, the amount of improvement of the throughput will not be so much.

Therefore, the present invention is performed in view of such a problem, thereby, the object of the present invention is to provide a wireless base station, a mobile station, a radio communication system and a radio communication method enabling reduction of interference between cells and improvement of maximum throughput to be achieved so as to improve spectrum efficiency.

In order to solve the above mentioned problem, the wireless base station in accordance with the present invention, which transmits radio signals between itself and a plurality of mobile stations by means of OFDMA, includes: multiplexing means for generating orthogonal frequency division multiplexed user data; channel assignment control means for selecting a plurality sets of sub-carriers among a plurality of sub-carriers dispersed on a frequency domain so as to constitute a radio frame containing sub-channels assigned for each of the plurality of sets of sub-carriers, and for setting in the radio frame the user data and control data regarding setting of the user data by means of orthogonal frequency division multiplexing, in the radio frame; and transmission means for transmitting a radio signal containing the radio frame, where, the channel assignment control means is constituted so as to divide the radio frame into 2 zones for the control and user data, divide all sub-channels in the zone for the control data into groups for each of sectors of the radio signal, allocate the corresponding divided sub-channel groups for the control data, and allocate all the sub-channels in the zone for the user data.

Alternatively, the radio communication method in accordance with the present invention, in which the wireless base station transmits radio signals between itself and a plurality of mobile stations by means of OFDMA, where, multiplexing means include a multiplex step for generating orthogonal frequency division multiplexed user data; channel assignment control means include a channel assignment control step for selecting a plurality of sets of sub-carriers among a plurality of sub-carriers dispersed on a frequency domain so as to constitute a radio frame containing sub-channels assigned for each of the plurality of sets of sub-carriers, and for setting in the radio frame the user data and control data regarding setting of the user data in the radio frame by means of orthogonal frequency division multiplexing in the radio frame; and transmission means include a transmission step for transmitting radio signals containing the radio frame, where, in the channel assignment control step the radio frame is divided into 2 zones for the control and user data, and all the sub-channels in the zone for the control data are divided into groups for each of sectors of the radio signal, the control data is allocated on the corresponding divided groups, and the user data is allocated on all the sub-channels in the zone for the user data.

According to such a wireless base station and such a radio communication method, a radio frame containing sub-channels assigned to each of the plurality sets of sub-carriers is constituted, in which the user data and control data regarding the setting of the user data in the radio frame are set by means of time division multiplexing, and radio signals containing the radio frame are transmitted toward mobile stations. At that time, since the sub-channels in the radio frame are divided into groups of each sectors, the control data is allocated on the corresponding divided groups, and the user data is allocated on all the sub-channels, missing of the control data resulting from interference between cells at the mobile station side can be prevented from occurring, thus reception quality regarding the user data at the cell edge can be ensured, and at the same time maximum throughput at the time of transmitting the user data can be improved.

In the wireless base station, it is preferable for the channel assignment control means to set first radio resource allocation information specifying the area of the radio resource allocation of the control data in the radio frame, and set second radio resource allocation information indicating the resource allocation of the user data in the radio frame and that the user data is stored on all the sub-channels, in the control data. If such channel assignment control means are provided, it is possible for the wireless base station to inform the radio resource allocation of the control data in divided groups in the radio frame to mobile stations using first radio resource allocation information, and to inform the allocation range of the user data using second radio resource allocation information. Thereby, the control data and the user data can be surely taken out from the ranges of different sub-channels in the radio channel at the mobile station side.

Moreover, in the wireless base station, it is also preferable for the channel assignment control means to receive a request signal for network connection transmitted from the mobile station, and when data set in the radio frame of the request signal is transmitted on sub-carriers distributed on the divided sub-channel groups, allocate the user data on the corresponding divided sub-channel groups in the radio signal for use of the mobile station, and when the data is transmitted on sub-carriers distributed on all the sub-channels in the radio frame of the request signal, allocate the user data on all the sub-channels in the radio frame of the radio signal for use of the mobile station. If such configuration is adopted, it is possible for the radio resource allocation of the connection request signal received from the mobile station to be determined whether the user data is set on all the sub-channels or on the divided sub-channel groups, depending on the radio resource allocation. Thereby, ensuring of the reception quality regarding the user data and the improvement of throughput can be achieved, in adapting to the function of the mobile station side.

Further, in the wireless base station, it is also preferable for the channel assignment control means to set sub-carriers for transmitting a pilot signal for estimating channel state so as to be in different arrangement for each of sectors, in a process for generating sub-channels constituted by the plurality of sub-carriers in the radio frame, and for the transmission means to transmit a radio signal containing the radio frame in which the pilot signal is set. Since, even if user data is allocated on all the sub-channels and transmitted regardless to sectors, this causes the sub-carriers for transmitting the pilot signal to be transmitted in different arrangement for each of the sectors in the radio frame, interference of the pilot signal between neighboring sectors can be prevented from occurring. As a result, improvement of throughput at the time of transmitting the user data can be achieved, and at the same time, estimation accuracy of received signal of the user data can be improved.

Furthermore, in the wireless base station, it is also preferable for the channel assignment control means to select sub-channels by determining a selection criteria from the plurality of sub-carriers based on preliminarily assigned cell identification information, and to set sub-carriers for transmitting a pilot signal for estimating channel state so as to be in different arrangement for each of the cell identification information, and for the transmission means to transmit a radio signal containing a radio frame in which the pilot signal is set. In this case, since the pilot signal is transmitted in different arrangement for each of the cell identification information in the radio frame, even if the user data is allocated on all the sub-channels and transmitted regardless of the sectors, interference of the pilot signal between neighboring cells can be prevented from occurring. As a result, improvement of throughput at the time of transmitting the user data can be achieved, and at the same time, estimation accuracy of received signal of the user data can be improved.

A mobile station in accordance with the present invention, which receives a radio signal between itself and a wireless base station by means of OFDMA, includes: reception means for receiving a radio signal containing a radio frame composed of sub-channels assigned for each of a plurality of sets of sub-carriers selected among a plurality of sub-carriers dispersed on a frequency axis, from the wireless base station; and channel assignment analysis means for taking out control data regarding setting of user data in the radio frame and the orthogonal frequency division multiplexed user data, from the radio frame, where, the channel assignment analysis means is constituted so as to divide the radio frame into 2 zones for the control and user data, divide all sub-channels in the zone for the control data into groups for each sectors of the wireless base station, to take control data out from the groups corresponding to the mobile station, and to take user data out from all the sub-channels in the zone for the user data.

According to the mobile station having such configuration, a radio signal is received from the wireless base station, a radio frame having sub-channels assigned for each of the plurality sets of sub-carriers is contained in the radio signal, and, in the radio frame, user data and control data regarding setting of the user data in the radio frame are set by means of orthogonal frequency division multiplexing. In addition, since the control data is taken out from the groups corresponding to the divided sub-channels in the zone of received radio frame, and the user data is taken out from all the sub-channels in the zone of radio frame, reception quality regarding the user data can be ensured by preventing missing of the control data resulting from interference between cells at the mobile station side from occurring, and at the same time, maximum throughput at the time of transmitting the user data can be improved.

It is preferable for the mobile station having such configuration, to include further channel assignment control means for setting uplink data on a region differing from that of control data and user data set by the wireless base station in the radio frame; and transmission means for transmitting a radio signal containing the radio frame in the region; where, the channel assignment control means sets sub-carriers for transmitting a pilot signal for estimating channel state so as to be in different arrangement for each of the sectors specified by the control data; and the transmission means transmit a radio signal containing the radio frame on the region in which the pilot signal is set. If such configuration is adopted, since, even if uplink data is stored on all the sub-channels and transmitted regardless of the sectors, the sub-carriers for transmitting the pilot signal are transmitted in different arrangement for each of the sectors in the radio frame, interference between pilot signals between neighboring sectors can be prevented from occurring. As a result, estimation accuracy of the received signal of the uplink data can be improved.

A radio communication system in accordance with the present invention has the wireless base station and mobile station which are mentioned above.

Alternatively, a radio communication method in accordance with the present invention, in which a wireless base station and a mobile station transmit and receive a radio signal by means of OFDMA, includes: a multiplexing step where the wireless base station generates orthogonal frequency division multiplexed user data; a channel assignment control step where the wireless base station selects a plurality sets of sub-carriers among a plurality of sub-carriers dispersed on a frequency domain so as to constitute a radio frame containing sub-channels assigned for each of the plurality sets of sub-carriers, and sets user data and control data regarding to setting of the user data in the radio frame by means of orthogonal frequency division multiplexing, in the radio frame; a transmission step where the wireless base station transmits a radio signal containing the radio frame; a reception step where the mobile station receives the radio signal from the wireless base station; and a channel assignment analysis step where the mobile station takes out the control data regarding the setting of the user data in the radio frame and the orthogonal frequency division multiplexed user data from the radio frame; where, in the channel assignment control step, the radio frame is divided into 2 zones for the control and user data, and all the sub-channels in the zone for the control data are divided into groups for each of sectors of the radio signal, the control data is allocated on the corresponding divided groups, and the user data is allocated on all the sub-channels in the zone for the user data, and in the channel assignment analysis step, the radio communication method takes out the control data from the areas corresponding to the mobile station, and takes out the user data from all the sub-channels in the radio frame.

According to such a radio communication system and such a radio communication method, a radio frame containing sub-channels assigned for each of the plurality of sub-carriers is constituted; user data and control data regarding the setting of the user data in the radio frame are set in the radio frame by means of orthogonal frequency division multiplexing; and a radio signal containing the radio frame is transmitted toward a mobile station. At that time, the radio frame is divided into 2 zones for the control and user data, sub-channels in the radio frame are divided into sub-channel groups for each of the sectors, the control data is allocated on the corresponding divided groups, and the user data is allocated on all the sub-channels. On the other hand, since a radio signal from the wireless base station is received by the mobile station, the control data is taken out from the corresponding groups of the divided sub-channels in the received radio frame, and the user data is taken out from all the sub-channels in the zone of user data, reception quality regarding the user data can be ensured by preventing missing of control data at the mobile station side resulting from interference between cells from occurring, and at the same time maximum throughput at the time of transmitting the user data can be improved.

BRIEF DESCRIPTION OF THE DRAWINGS

FIG. 3 is a conceptual view illustrating data arrangement on a time axis and on a frequency axis of a radio frame generated by the channel assignment control part in FIG. 1;

FIG. 6 is a view illustrating one example of mapping information in FIG. 3;

FIG. 12 is a view illustrating arrangement images of pilot signals in an assembly of a plurality of continuous sub-carriers and symbols in a radio frame by the wireless base station in FIG. 10;

FIG. 13 is a view illustrating arrangement images of pilot signals in an assembly of a plurality of continuous sub-carriers and symbols in a radio frame by the mobile station in FIG. 11;

FIG. 14 is a view illustrating other arrangement images of pilot signals in an assembly of a plurality of continuous sub-carriers and symbols in a radio frame by the mobile station in FIG. 11;

FIG. 15 is a view illustrating the frequency bands of carriers for each of sectors in a conventional radio communication system.

DESCRIPTION OF THE PREFERRED EMBODIMENTS

Figure 1:
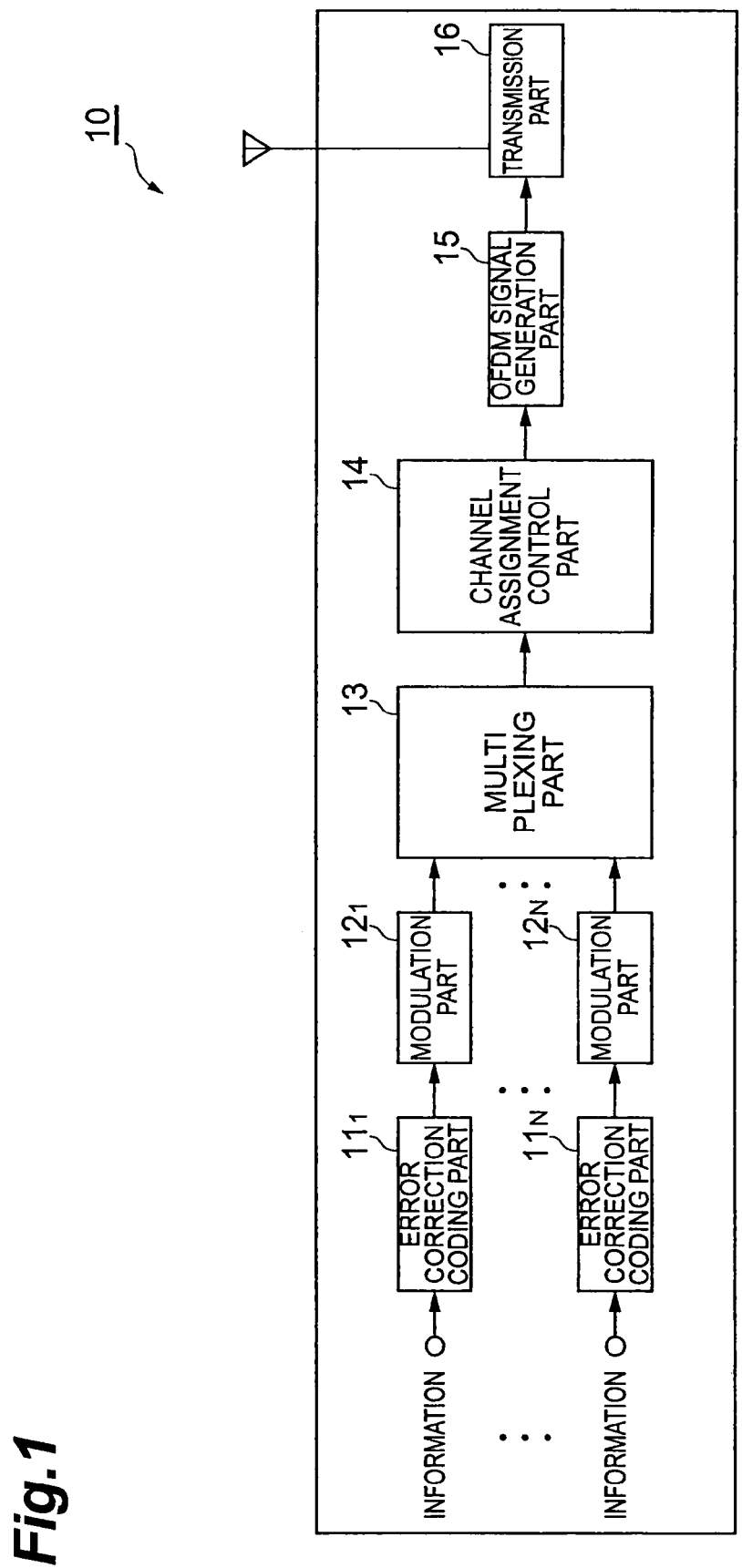
FIG. 1 is a schematic configuration view of a wireless base station in accordance with one suitable embodiment of the present invention.

Hereinafter, with reference to drawings, suitable embodiments of a radio communication system and a radio communication method in accordance with the present invention will be described in detail. In addition, in the description of drawings, the same element is denoted by the same reference numeral, and duplicated description will be eliminated.

Figure 2:
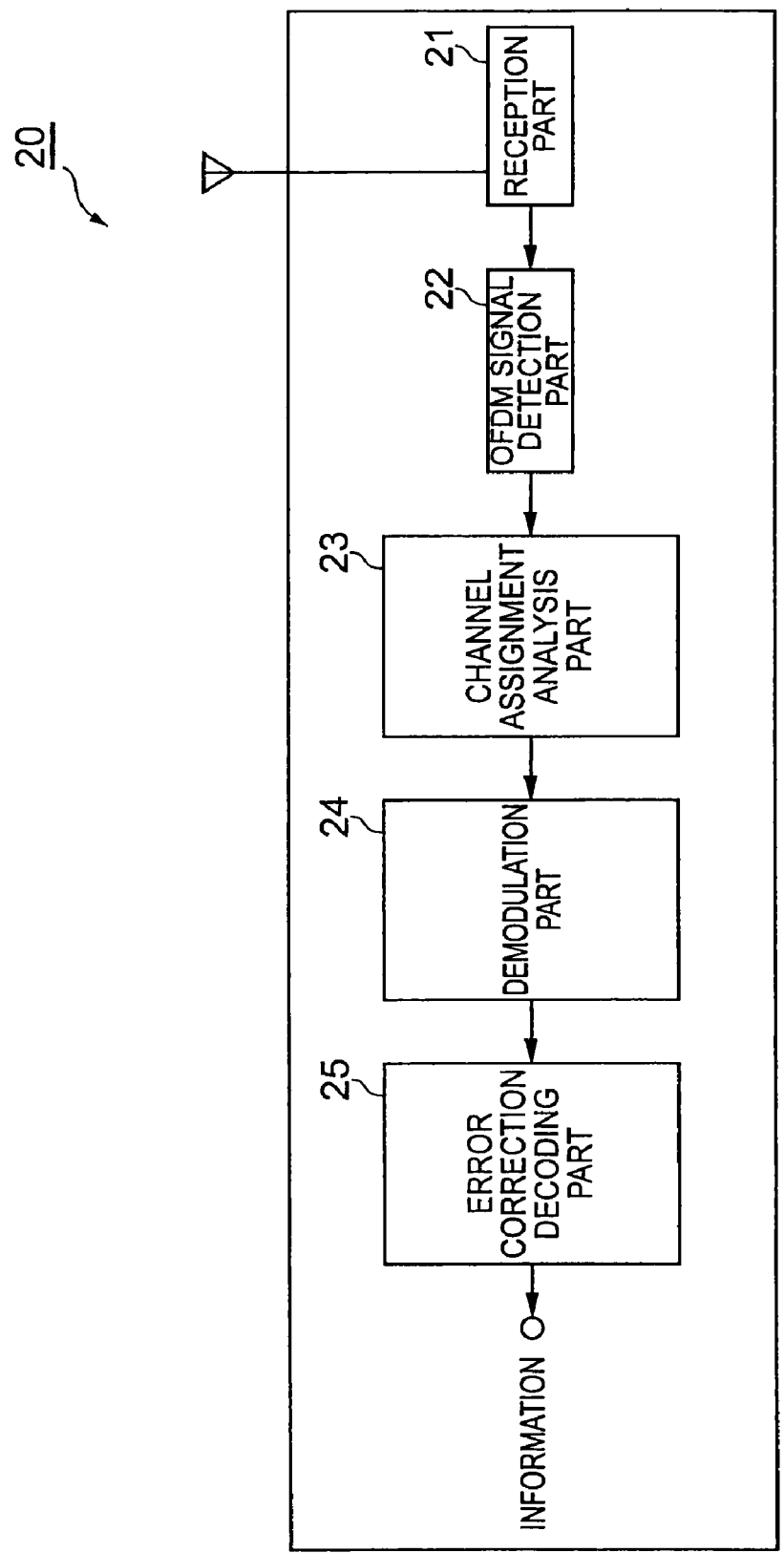
FIG. 2 is a schematic configuration view of a mobile station in accordance with one suitable embodiment of the present invention.

FIGS. 1 and 2 are schematic configuration views of a wireless base station 10 and a mobile station 20 in accordance with one suitable embodiment of the present invention, respectively. A radio communication system in accordance with the present embodiment is constructed while including a plurality of wireless base stations 10 and mobile stations 20, where, using Orthogonal Frequency Division Multiple Access (OFDMA) based on IEEE802.16e, a radio signal is transmitted and received between the wireless base station 10 and the mobile station 20. So called OFDMA is a kind of multi-carrier transmission which divides all the bands of transmission carriers into sub-carriers on a frequency domain, and transmits a radio signal as a packet of a plurality of sub-carriers having narrow bands. As the bandwidths of the transmission carriers, for example, 5 MHz, 10 MHz, and 20 MHz are selected. First, functional configurations of the wireless base station 10 and the mobile station 20 will be described in detail.

As illustrated in FIG. 1, the wireless base station 10 has error correction coding parts $11_1$ to $11_N$, modulation parts $12_1$ to $12_N$, a multiplexing part (multiplexing means) 13, a channel assignment control part (channel assignment control means) 14, an OFDM signal generation part 15, and a transmission part (transmission means) 16. Each of target information transmitted to a plurality of mobile stations 20 is subjected to error correction coding processing by error correction coding parts $11_1$ to $11_N$, redundancy bit information output from the error correction coding parts $11_1$ to $11_N$ after being subjected to the error correction coding processing is generated as user data subjected to time division multiplexing via the modulation parts $12_1$ to $12_N$, the multiplexing part 13. The user data output from the multiplexing part 13 is set in a radio frame by the channel assignment control part 14, the radio frame is converted into a radio signal for OFDMA by the OFDM signal generation part 15, and the radio signal is transmitted toward an external mobile station 20 by a transmission part 16 by means of OFDMA. Here, the wireless base station 10 is enabled to transmit separate radio signals to three sectors in a cell that is an area in which radio communication to the mobile station 20 is possible.

The channel assignment control part 14 generates a radio frame by assigning channels in the radio frame as follows. In FIG. 3A, data arrangement on the time axis and the frequency axis of the radio frame generated by the channel assignment control part 14 is illustrated conceptually. The channel assignment control part 14 assigns a channel to every Sub-channel Logical Numbers based on a predetermined standard. In particular, in bands of frequency which is transmittable for the wireless base station 10, a plurality sets of sub-carrier groups are selected among a plurality of sub-carriers dispersed on a frequency axis. Then, by assigning a sub-channel identified by Sub-channel Logical Number for each of the plurality of sets of sub-carrier groups, a radio frame is constructed.

Further, the channel assignment control part 14 generates a radio frame while separating it in terms of time into a down link part DL which transmits control and user data from the wireless base station 10 to the mobile station 20, and an up link part UL which also transmits control and user data from the mobile station 20 to the wireless base station 10. In the down link part DL, a preamble part $D_P$ for synchronizing the radio frame at the reception side, a control data part $D_C$ for controlling data read-out for each of the sectors in the radio frame, and a user data part $D_U$ for carrying user data for a plurality of mobile stations, are arranged. FIG. 3B is a conceptual view illustrating the data arrangement on the time axis and frequency axis of the control data part $D_C$ of the radio frame, in a more detailed manner. As illustrated in the figure, the control data part $D_C$ includes a frame control header (FCH) $D_{C1}$ for specifying the sub-channel groups used for each of sectors in the radio frame, and mapping information $D_{C2}$, such as DL-MAP and UL-MAP which illustrate the setting region of the user data in the sub-channels specified by FCH.

Figure 4:
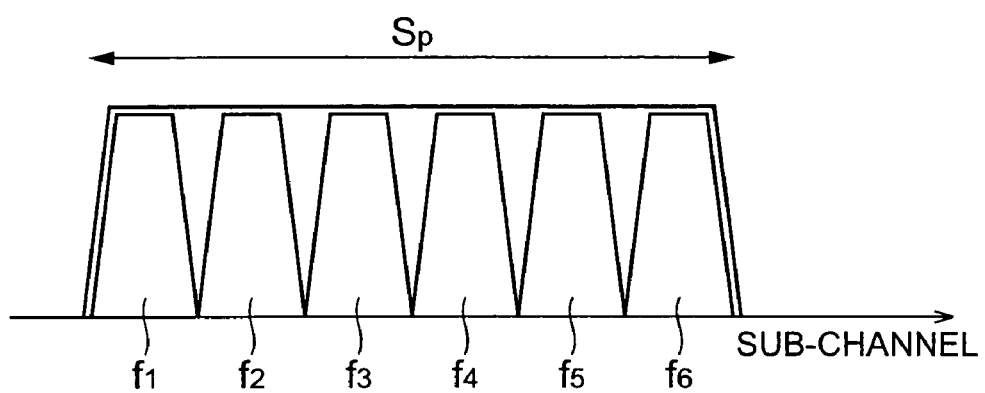
FIG. 4 is a view illustrating images of sub-channels after divided.
Figure 5:
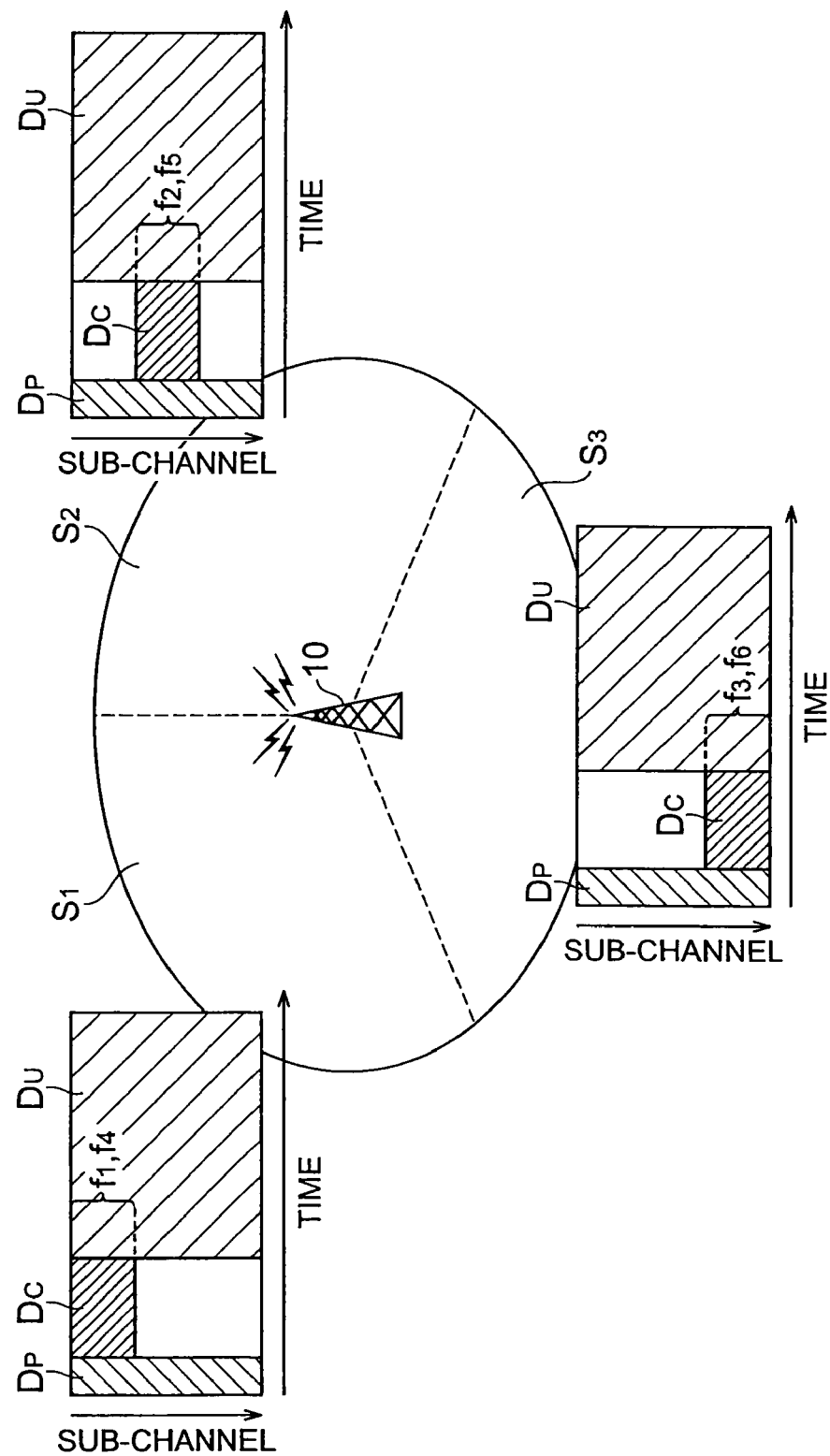
FIG. 5 is a conceptual view illustrating radio frames generated by the wireless base station in FIG. 1 for each of sectors.

Therefore, the channel assignment control part 14 sets the control data part $D_C$ in a radio frame by means of time division multiplexing as follows. In other words, using PUSC (Pertial Usage of Sub Channels) as an assignment scheme of frequency division for each of sectors, sub-channels contained in the entire bands Sp assigned in the radio frame are divided into six sub-channel groups $f_1$ to $f_6$ that are logical groups (refer to FIG. 4), two sub-channel groups of the sub-channel groups $f_1$ to $f_6$ are assigned into three of the sectors. And the channel assignment control part 14 sets the control data part $D_C$ in the area of the corresponding sub-channel group in the radio frame depending on the sector of a transmission destination. In FIG. 5, an example is illustrated, in which sub-channel groups $f_1$ and $f_4$ are assigned to a sector $S_1$, sub-channel groups $f_2$ and $f_5$ are assigned to a sector $S_2$, and sub-channel groups $f_3$ and $f_6$ are assigned to a sector $S_3$, as the radio resource for setting the control data part $D_C$ respectively. In the channel assignment control part 14, when the control data part $D_C$ is set, after the size of a frame control header $D_{C1}$ and mapping information $D_{C2}$ including DL-MAP, UL-MAP, and the like, is estimated based on the information output from the multiplexing part 13, size of the radio resource of control data is determined, and the temporal position of separation between the control data part $D_C$ and the user data part $D_U$ is obtained. Moreover, in the channel assignment control part 14, by embedding information designating setting position of the frame control header $D_{C1}$ in the preamble part $D_P$, and by embedding information (first resource allocation information) specifying sub-channel groups belonging to areas assigned to the sectors in the frame control header $D_{C1}$, the control data part $D_C$ can be taken out at the side of the mobile station 20.

Moreover, in the channel assignment control part 14, after setting the control data part $D_C$, user data output from the multiplexing part 13 is allocated on the user data part $D_U$ of which areas are determined on all the sub-channels contained in the radio frame. In addition, in the channel assignment control part 14, information indicating the allocation start position of the user data and information indicating that the user data is allocated on all the sub-channels in the user data part $D_U$ are set in DL-MAP contained in mapping information $D_{C2}$ in the control data part $D_C$, in advance, and by these information, allocation areas of the user data at the side of the mobile station 20 can be specified. FIG. 6 is a view illustrating an example of the configuration of data set in DL-MAP contained in the mapping information $D_{C2}$, into data item "OFDMA symbol offset" of the data classification of "Zone Switch IE" in DL-MAP, allocation starting point of the user data, that is, the information specifying separation position between the control data part $D_C$ and the user data part $D_U$ is set, and into data item "Use All SC indicator", value "1" illustrating that user data is allocated on all the sub-channel groups is set. Thereby, it is possible to announce to the mobile station 20 being the side of reception that the user data part $D_U$ is expanded on all the sub-channels.

Next, moving to FIG. 2, the mobile station 20 has a reception part (reception means) 21, an OFDM signal detection part 22, a channel assignment analysis part (channel assignment analysis means) 23, a demodulation part 24, and an error correction decoding part 25. The reception part 21 receives a radio signal containing a radio frame transmitted from the wireless base station using OFDMA, and when the received radio signal is detected by the OFDM signal detection part 22, the radio frame is taken out from the radio signal. After control data part $D_C$ is taken out by the channel assignment analysis part 23 from the taken-out radio frame, user data is further taken out from the radio frame by analyzing the control data part $D_C$. Then, after being demodulated from data subjected to time division multiplexing by the demodulation part 24, the user data is subjected to error correction decoding processing by the error correction decoding part 25 and decoded into information intended for the mobile station 20.

The channel assignment analysis part 23 analyzes the radio frame output from the OFDM signal detection part 22 by assigning sub-channels as follows. In other words, the channel assignment analysis part 23 assigns sub-channels for each of subchannel logical numbers based on the same standard as that of the wireless base station 10. In particular, a plurality of sub-carrier groups are selected from a plurality of sub-carriers dispersed on the frequency axis in the frequency band of a carrier signal of the wireless base station 10. Then, by assigning sub-channels each identified with a subchannel logical number for each of the plurality of sub-carrier groups, the radio frame is analyzed.

After that, the channel assignment analysis part 23 reads the preamble part $D_P$ of the radio frame, and based on information written in the preamble part $D_P$, the frame control header $D_C$ (FIG. 3B) of the control data part $D_C$ is taken out. Then, based on first resource allocation information contained in the frame control header $D_{C1}$, the channel assignment analysis part 23 specifies groups constituted by two sub-channel groups assigned to the sector where the mobile station is located, and the group is divided from the radio frame. For example, when the mobile station 20 is located at sector $S_1$, an area containing sub-channel groups $f_1$ and $f_4$ is divided from the radio frame (FIG. 5). Then, the channel assignment analysis part 23 takes out mapping information $D_{C2}$ containing DL-MAP and UL-MAP from the divided group. After that, the channel assignment analysis part 23 reads out the parts of the data item "OFDMA symbol offset" and the data item "Use All SC indicator" from DL-MAP, and while specifying starting position of the user data part $D_U$ from these information, determines that the user data part $D_U$ is expanded on all the sub-channels in the radio frame.

Further, after interpreted the control data part $D_C$, the channel assignment analysis part 23 takes out the user data intended for the mobile station 20 from the user data part $D_U$ set at an zone containing all the sub-channels in the radio frame and outputs it to the demodulation part 24. At that time, the channel assignment analysis part 23 can specify the resource allocation of the user data for the mobile station 20 in the user data part $D_U$ by DL-MAP contained in mapping information $D_{C2}$.

Figure 7:
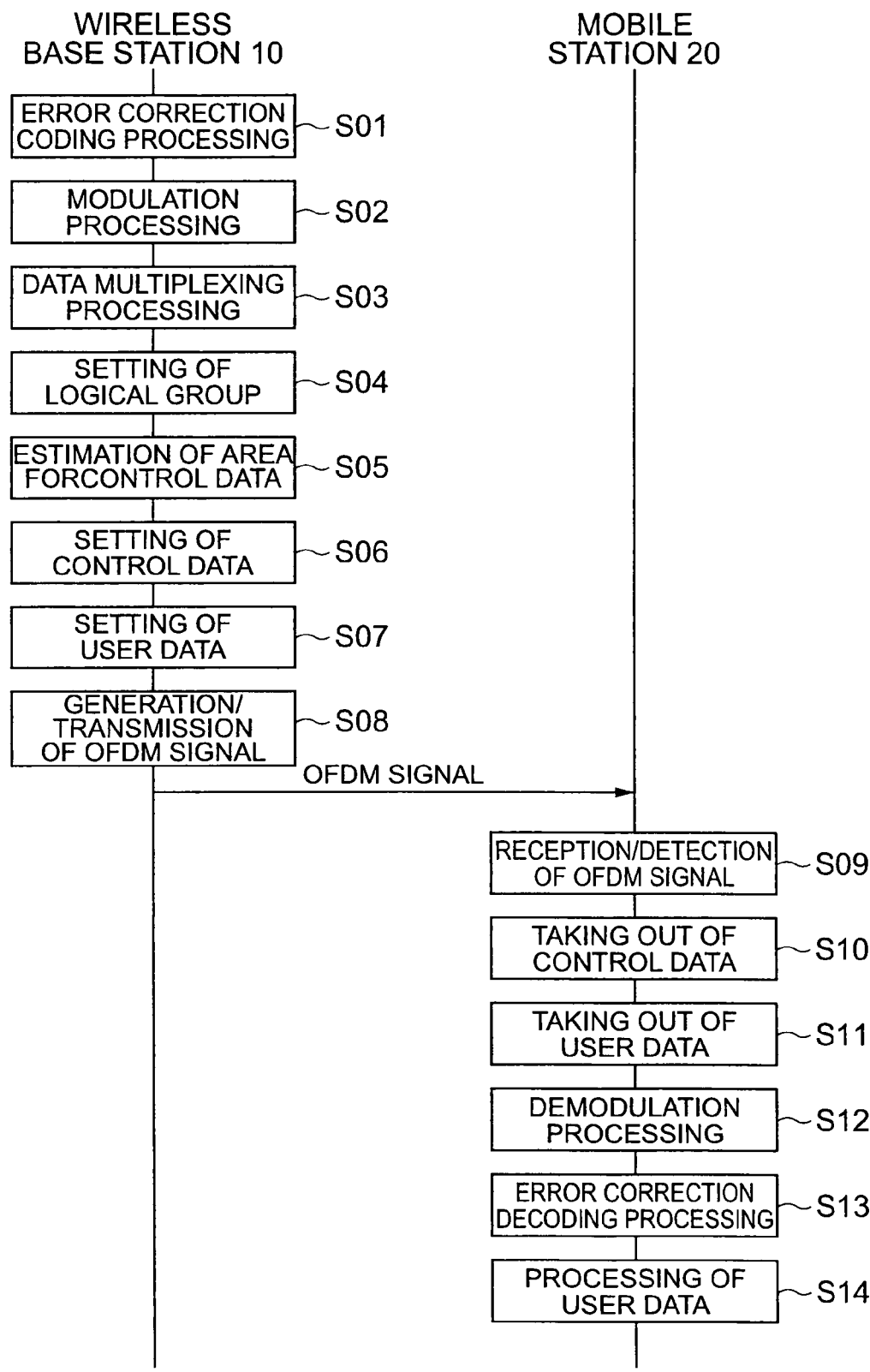
FIG. 7 is a sequential view illustrating the operation of a radio communication system in accordance with the present embodiment.

Next, with reference to FIG. 7, the operation of a radio communication system including the wireless base station 10 and the mobile station 20 will be described, and at the same time, the radio communication method of the radio communication system will be described in detail. FIG. 7 is a sequential view illustrating the operation of the radio communication system when user data is transmitted from the wireless base station 10 to the mobile station 20.

As illustrated in this figure, first, when the information to be transmitted to the mobile station 20 from a radio communication network in the wireless base station 10 is received, by error correction coding parts $11_1$ to $11_N$ of the wireless base station 10, error correction coding processing is subjected to the information (step S01). Redundancy bit information generated by means of the error correction coding processing is subjected to modulation processing by modulation parts $12_1$ to $12_N$ (step S02), and subsequently subjected to data multiplexing processing by the multiplexing parts 13 (step S03), and orthogonal frequency division multiplexed user data is generated.

Next, the channel assignment control part 14 sets areas containing two sub-channel groups corresponding to sectors (step S04). Then, the channel assignment control part 14 estimates the size of the control data part $D_C$ based on information output from the multiplexing part 13 (step S05). Further, the channel assignment control part 14 allocates a frame control header $D_{C1}$ and mapping information $D_{C2}$ in the control data part $D_C$ of the radio frame (step S06). After setting the control data part $D_C$, the channel assignment control part 14 allocates the user data on all the sub-channels of the radio frame (step S07). By this procedure, a radio signal for OFDMA is generated by the OFDM signal generation part 15, and the radio signal is transmitted by the transmission part 16 toward the mobile station 20 (step S08).

On the other hand, the radio signal is received by the reception part 21 of the mobile station 20, and when the radio signal is detected by the OFDM signal detection part 22, a radio frame is taken out from the radio signal (step S09). The channel assignment analysis part 23 extracts the preamble part $D_P$, the frame control header $D_{C1}$ in the control data part $D_C$, and the mapping information $D_{C2}$ from the radio frame one by one (step S10). After that, the channel assignment analysis part 23 takes out user data from the user data part $D_U$ expanded on all the sub-channels in the radio frame by interpreting DL-MAP of the mapping information $D_{C2}$ (step S11).

The user data taken out in this manner is demodulated from orthogonal frequency division multiplexed data as redundancy bit information by the demodulation part 24 (step S12). Then, the redundancy bit information is subjected to error correction decoding processing by the error correction decoding part 25 so as to reconstruct the original information (step S13). Finally, the information is subjected to desired processing by application programs etc. in the mobile station 20 (step S14).

According to the radio communication system and the radio communication method have been mentioned above, a radio frame containing sub-channels assigned for each of a plurality of sets of sub-carriers is constituted; in the radio frame, user data and control data, such as a frame control header $D_{C1}$, DL-MAP and UL-MAP regarding to the setting of the user data in the radio frame, are set by means of orthogonal frequency division multiplexing; and a radio signal containing the radio frame is transmitted toward the mobile station 20. In this case, the radio frame is divided into 2 zones for the control and user data, the sub-channels in the radio frame are divided into groups for each of sectors, the control data is allocated on the corresponding divided groups, and the user data is allocated on all the sub-channels. On the other hand, a radio signal from the wireless base station 10 is received by the mobile station 20, control data is taken out from corresponding divided sub-channels in the received radio frame, and user data is taken out from all the sub-channels in the radio frame. Therefore, reception quality regarding to the user data can be ensured while preventing missing of the control data at the mobile station side resulting from interference between cells from occurring, and at the same time maximum throughput at the time of transmitting the user data can be improved. In other words, as compared to a conventional case where both of the control data and the user data are set into divided zones in the radio frame, both of prevention of affect of interference between cells and improvement of maximum throughput can be satisfied.

In addition, the present invention is not limited to the above-mentioned embodiment. For example, depending on the functions provided to the mobile station 20, the wireless base station 10 may operate so as to determine whether division of the setting area of the user data in the radio frame is performed or not.

Figure 8:
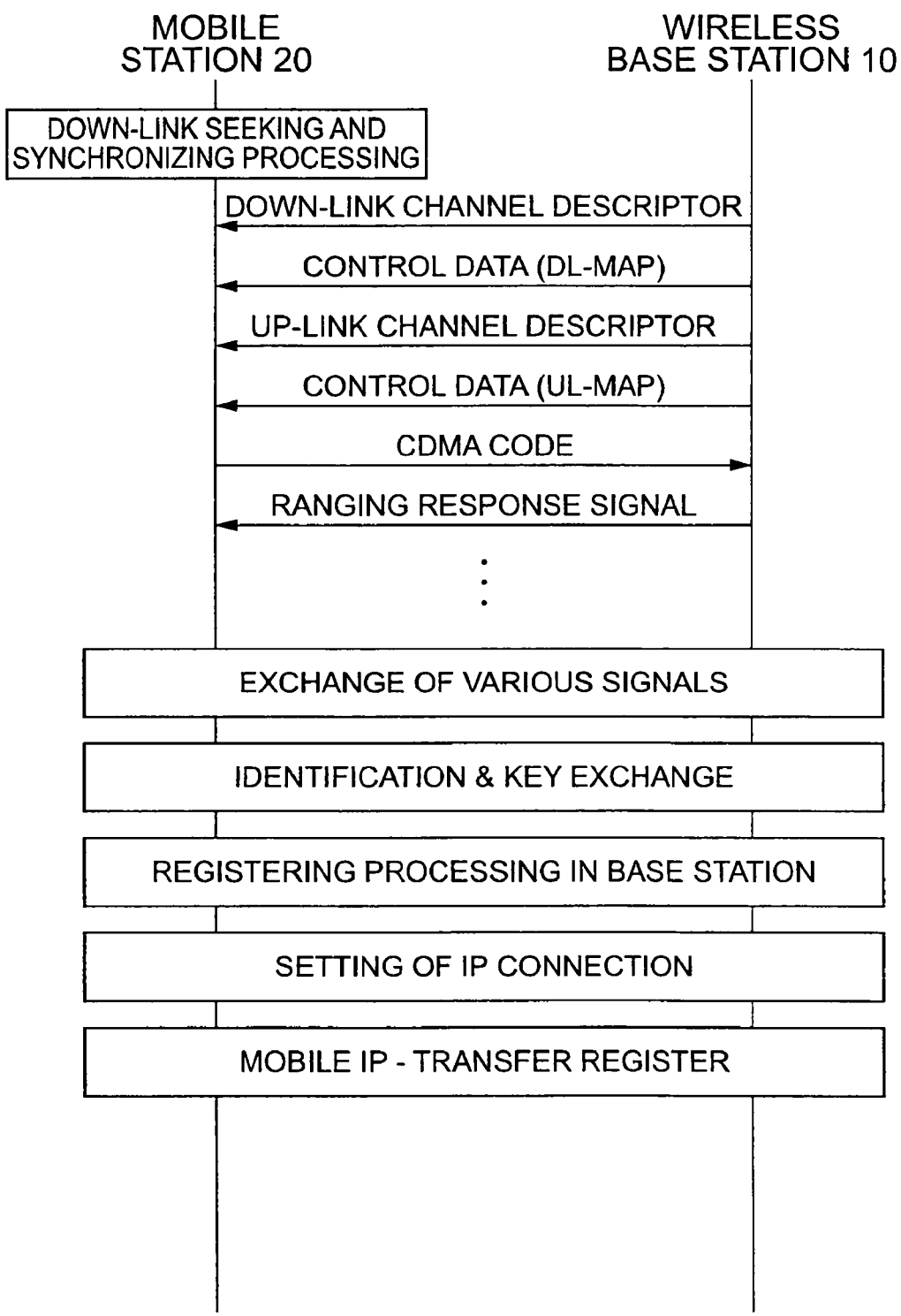
FIG. 8 is a sequential view illustrating the procedure when network connection from the mobile station 20 in FIG. 2 to the wireless base station 10 in FIG. 1 is requested.
Figure 9:
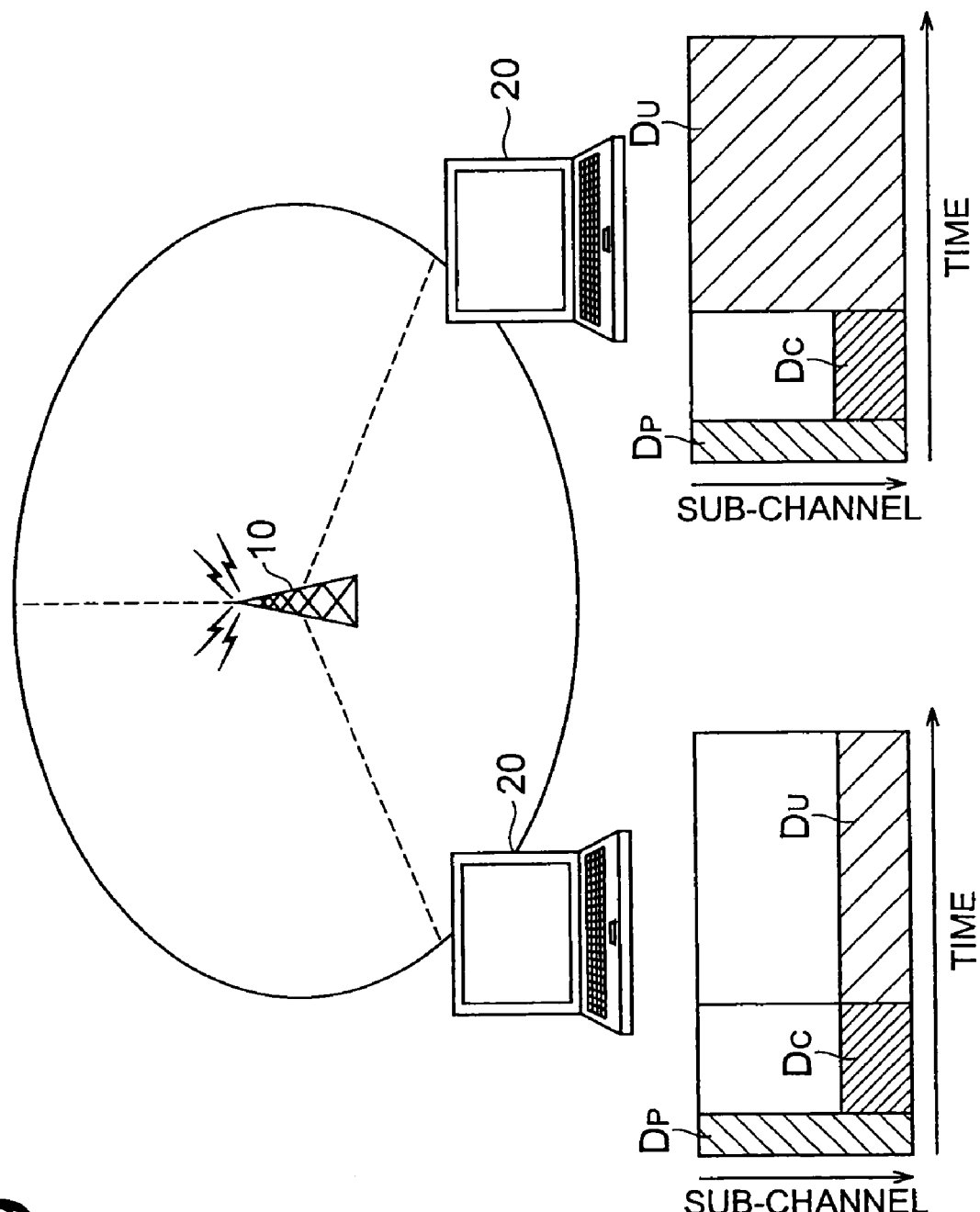
FIG. 9 is a conceptual view illustrating radio frames generated by a wireless base station in accordance with a modified embodiment of the present invention.

In this case, the wireless base station 10 can determine whether the functions of the mobile station correspond only to the radio frame divided into three parts or not by the request signal transmitted from the mobile station to the wireless base station 10 at the time of request processing (Initial Ranging) of network connection. FIG. 8 is a sequential view illustrating the procedure at the time of requesting network connection to the wireless base station 10 from the mobile station 20. The channel assignment control part 14 of the wireless base station 10 receives the radio frame containing CDMA code transmitted from the mobile station 20 in this procedure. And when the user data containing the CDMA code is transmitted on sub-carriers distributed on all the sub-channels in the radio frame, in the radio frame subsequently transmitted to the mobile station 20, downlink user data is allocated on all the sub-channels. On the other hand, when the user data containing the CDMA code is transmitted on sub-carriers distributed on the sub-channel groups divided into three parts of in the received radio frame, in the radio frame subsequently transmitted to the mobile station 20, downlink user data is allocated on the sub-channel groups divided into three parts corresponding to the sectors (FIG. 9). Thereby, whether setting of the user data is distributed on all the sub-channels, or on the divided sub-channel groups depending on data allocation groups in a request signal received from the mobile station 20, by determining the data allocation groups in the request signal received from the mobile station 20 can be determined, thereby, by adapting to the functions at the mobile station side, missing of reception data in the mobile station can be prevented from occurring.

Figure 10:
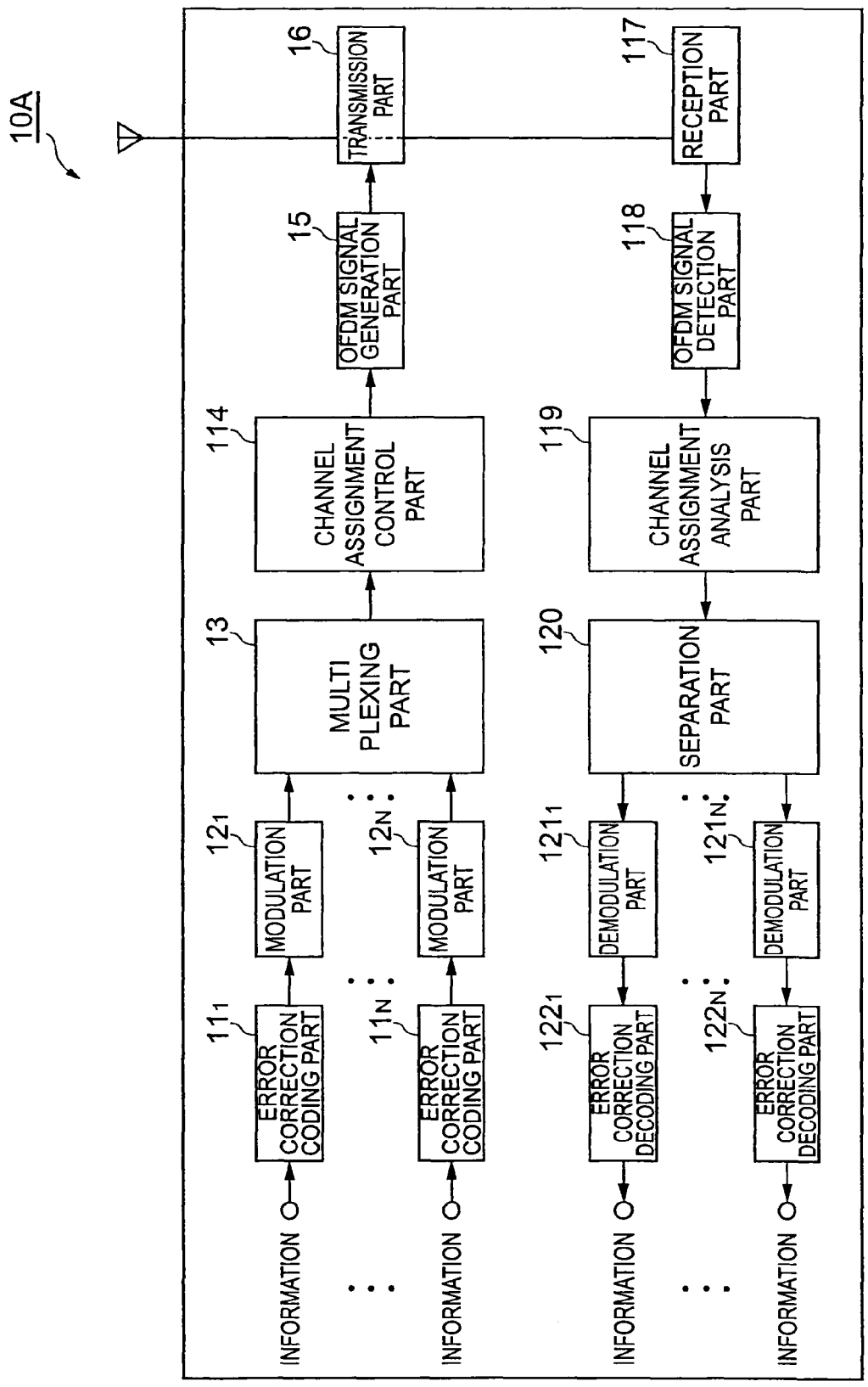
FIG. 10 is a schematic configuration view of the wireless base station in accordance with the modified embodiment of the present invention.
Figure 11:
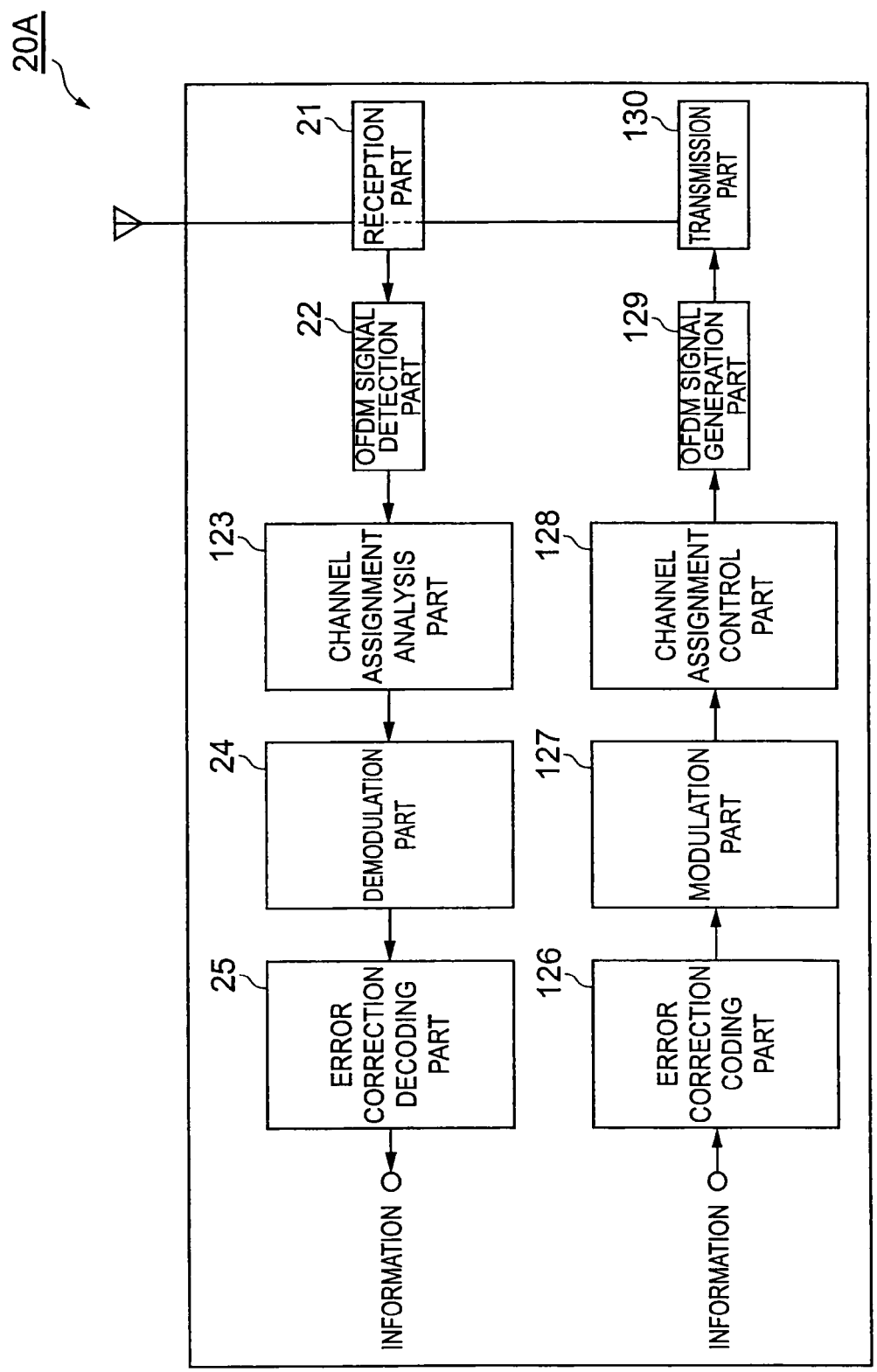
FIG. 11 is a schematic configuration view of a mobile station in accordance with the modified embodiment of the present invention.
Figure 16:
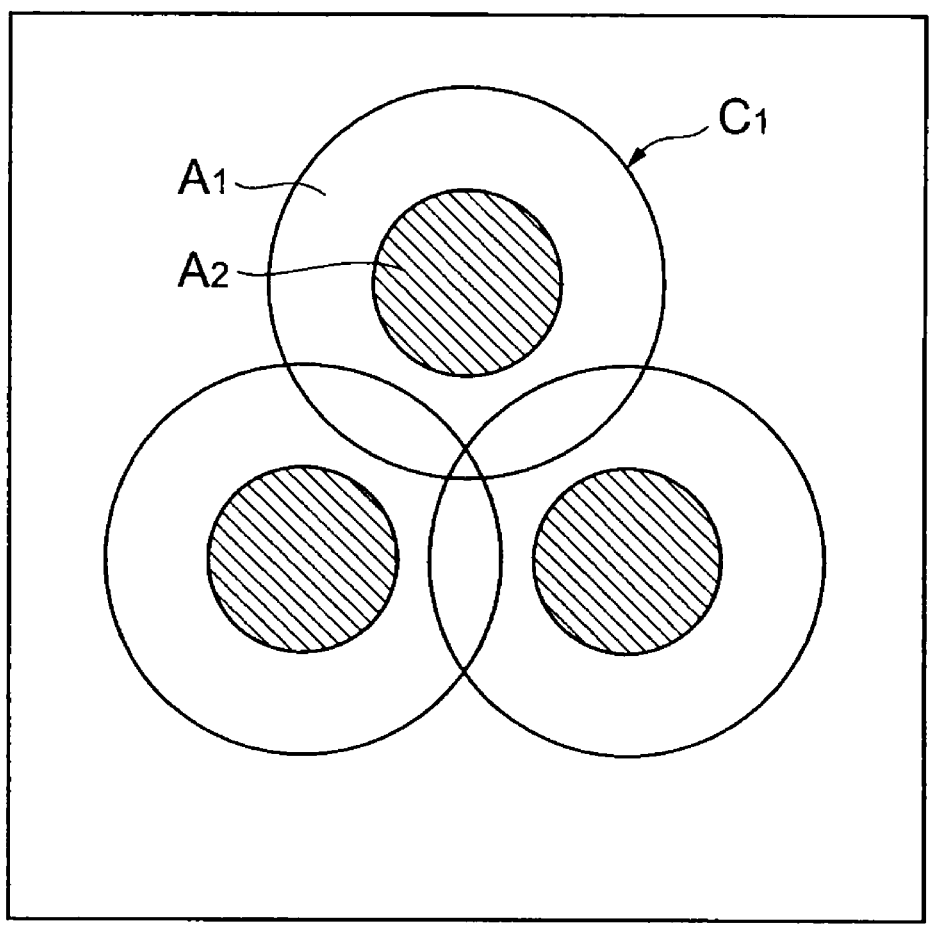
FIG. 16 is a view illustrating configuration of cells of the conventional radio communication system.

Moreover, although the wireless base station 10 and the mobile station 20 transmit pilot signals for estimating channel state in the transmitting and receiving radio frames using a plurality of sub-carriers in the radio frames, the sub-carriers for transmitting the pilot signals may be set so as to be in different arrangement for each sector or cell. FIGS. 10 and 11 are schematic configuration views of the wireless base station 10A and the mobile station 20A which are the modifications of the present invention in this case, respectively. Hereinafter, constituents of the wireless base station 10A and the mobile station 20A will be described by focusing on the difference between the constituents and those of the wireless base station 10 and the mobile station 20.

Referring to FIG. 10, the wireless base station 10A has further a reception part 117, an OFDM signal detection part 118, a channel assignment analysis part 119, a separation part 120, demodulation parts $121_1$ to $121_N$ and error correction decoding parts $122_1$ to $122_N$. The reception part 117 receives a radio signal containing a frame transmitted in time of UL illustrated in FIG. 3A from the mobile station 20A using OFDMA, and when the received radio signal is detected by the OFDM signal detection part 118, a radio frame is taken out from the radio signal. The uplink radio frame UL is assigned to an region which is different from that of the down-link radio frame DL where a control data part $D_C$ and a user data part $D_U$ in the radio frame are set (refer to FIG. 3A). In other words, the mobile station 20A transmits uplink user data at a region designated by the control data part $D_C$ in the down-link radio frame DL (refer to FIG. 3A) transmitted from the wireless base station 10A. In this manner, user data transmitted from a plurality of mobile stations including the mobile station 20A at different regions is taken out by the channel assignment analysis part 119 of the base station 10A, as uplink user data transmitted from the plurality of mobile station including the mobile station 20A. Then, the uplink user data separated into uplink user data for each of the mobile station including the mobile station 20A, demodulated by the demodulation parts $121_1$ to $121_N$, subsequently, subjected to error correction coding processing by error correction decoding parts $122_1$ to $122_N$, and is reconstructed to uplink user data for each of the mobile stations.

Moreover, by analyzing the pilot signals set to the uplink radio frame UL in the radio frame, and base on the reception power of the pilot signals, a channel assignment analysis part 119 can also estimate the channel state of radio environment between the wireless base station and the mobile station 20A. The estimated result of the channel state, can be used for control of the transmission power of a radio signal transmitted and received between the wireless base station and the mobile station 20A or the like.

A channel assignment control part 114, in a process where sub-channels are assigned and generated in the radio frame, divides a plurality sub-carriers into combinations of predetermined number of continuous sub-carriers, so called as clusters. For example, when the number of sub-carriers in the band of frequency which can be transmitted by the wireless base station 10A is 840, the channel assignment control part 114 divides the sub-carriers into clusters composed of 14 continuous sub-carriers. Then, the channel assignment control part 114 replaces the arrangement of the divided clusters, and subsequently, selects arbitrary sub-carriers among the clusters and assign them to one sub-channel. The sub-channels are provided with sub-channel logic numbers, respectively.

Moreover, in a process where a radio frame is generated by assigning sub-channels as mentioned above, the channel assignment control part 114 sets a pilot signal for estimating channel state in the radio frame at the mobile station 20A side. In other words, the channel assignment control part 114, during generating clusters, sets a predetermined sub-carrier in the cluster as the sub-carrier for transmitting a pilot signal. The sub-carrier for transmitting the pilot signal may be arranged in a manner where, as illustrated in FIGS. 12A, 12B and 12C, arrangement for odd symbols and arrangement for even symbols differ from each other. Specifically, referring to parameter Segment ID used for specifying a sector at the time of assigning sub-channels, the channel assignment control part 114 sets pilot signals so that the arrangement of the pilot signals differ from each other for cases of Segment ID="0", "1" and "2", as illustrated in FIGS. 12A, 12B and 12C, respectively. These figures illustrates that pilot signals are set on positions indicated by diagonal lines at odd-numbered symbols and even-numbered symbols on the 14 sub-carriers divided into each of the clusters. The radio signal including the radio frame where a pilot signal is set is transmitted by the transmission part 16 toward the mobile station 20A.

In addition, the channel assignment control part 114 can also set the sub-carriers for transmitting a pilot signal so that the arrangement of the sub-carriers differs from each other for each of the cells. In other words, the channel assignment control part 114, during assigning sub-carriers on the radio frame, based on the parameter IDcell (cell identification information) assigned in advance, determines the selection order of the plurality of clusters for each of the cells, and selects a plurality of sub-channels. At the same time, referring to the parameter IDcell the channel, the assignment control part 114 sets pilot signals so the arrangement of the pilot signals differ from each other for cases of Segment ID="0", "1" and "2", as illustrated in FIGS. 12A, 12B and 12C, respectively. For the parameter IDcell, in order to have values, for example, of 0 to 31, assigning different parameters IDcell on each of the cells in advance enables the arrangement of the pilot signals to be changed for each of the cells.

Referring to FIG. 11, the mobile station 20A has further an error correction coding part 126, a demodulation part 127, a channel assignment control part (channel assignment control means) 128, an OFDM signal generation part 129, and a transmission part (transmission means) 130. Target information to be transmitted to the wireless base station 10A, is subjected to error correction coding processing by the error correction coding part 126, and the redundancy bit information output from the error correction coding part 126 is generated as uplink user data subjected to data modulation by the modulation part 127. The uplink user data output from the modulation part 127 is set in a radio frame by the channel assignment control part 128, the radio frame is converted into a radio signal for OFDMA by the OFDM signal generation part 129, and the radio signal is transmitted by the transmission part 130 toward the wireless base station 10A using OFDMA.

Here the channel assignment control part 128, in a similar manner as that of the channel assignment control part 114 of the wireless base station 10A, assigns a plurality of sub-carriers to sub-channels, in an up-link radio frame UL (FIG. 3A) being present on a region differing from that of a down-link radio frame DL on the sub-channels, uplink user data is set. Moreover, by referring to the parameter Segment ID for specifying the sector superimposed in the preamble part $D_P$ transmitted from the wireless base station 10A, the channel assignment control part 128 selects combination of a plurality of symbols for each of the sectors from the up-link radio frame UL in the radio frame, and superimposes pilot signals on the selected plurality of symbols. Specifically, when PUSC is adopted as an assignment scheme of sub-carriers, the channel assignment control part 114 sets pilot signals so that the arrangement of the pilot signals differ from each other for cases of parameter Segment ID="0", "1" and "2", as illustrated in FIGS. 13A, 13B and 13C, respectively. Moreover, when OPUSC (Optional PUSC) is adopted as an assignment system of sub-carriers, the channel assignment control part 114 sets pilot signals so that the arrangement of the pilot signals differ from each other for cases of parameter Segment ID="0", "1" and "2", as illustrated in FIGS. 14A, 14B and 14C, respectively. FIGS. 13 and 14 illustrate arrangement of the sub-carriers for transmitting pilot signals in a tile generated in a process in which sub-channels are mapped on up-link radio signals. In other words, These figures illustrates that pilot signals are set on positions indicated by diagonal lines of 0-th to 2nd order symbols on four (or three) continuous sub-carriers which are divided in a tile of assembly of a plurality of continuous sub-carriers and symbols of the sub-carriers.

Moreover, by analyzing pilot signals set in the down-link radio frame DL in a radio frame, and based on the reception power of the pilot signals, the channel assignment analysis part 123 can also estimate the channel state of a radio environment between the mobile station and the wireless base station 10A. The estimated result of the channel state, can be used for control of the transmission power of a radio signal transmitted and received between the mobile station and the wireless base station 10A or the like.

According such wireless base station 10A and mobile station 20A, since, even if user data is allocated on all the sub-channels and transmitted regardless to sectors or cells, the sub-carriers for transmitting a pilot signal are transmitted in different arrangement for each of the sectors or each of the cells in the radio frame, interference between pilot signals between neighboring sectors or between neighboring cells can be prevented from occurring. As a result, it is possible to improve the maximum throughput at the time of user data transmission, and estimation accuracy of channel state at the reception side of the user data.

What is claimed is:

1. A wireless base station which transmits radio signals between itself and a plurality of mobile stations by means of OFDMA, comprising:
    multiplexing means for generating orthogonal frequency division multiplexed user data;
    channel assignment control means for selecting a plurality sets of sub-carriers among a plurality of sub-carriers dispersed on a frequency domain so as to constitute a radio frame containing sub-channels assigned for each of the plurality sets of sub-carriers, and for setting the user data and control data regarding setting of the user data in the radio frame by means of orthogonal frequency division multiplexing, in the radio frame; and
    transmission means for transmitting a radio signal containing the radio frame,
wherein,
    the channel assignment control means is constituted so as to divide the radio frame into 2 zones for the control and user data, divide all sub-channels in the zone for the control data into groups for each of sectors of the radio signal, allocate the corresponding divided sub-channel groups for the control data, and allocate all the sub-channels in the zone for the user data.

2. The wireless base station according to claim 1, wherein the channel assignment control means set first radio resource allocation information specifying the areas of the radio resource allocation of the control data, in the radio frame, and set second radio resource allocation information indicating the resource allocation of the user data in the radio frame and that the user data is stored on all the sub-channels, in the control data.

3. The base station according to claim 1 or 2, wherein the channel assignment control means receive a request signal for network connection transmitted from the mobile station, when data set in the radio frame of the request signal is transmitted on sub-carriers distributed on divided sub-channel groups, allocate the user data on the corresponding divided sub-channel groups in the radio signal for use of the mobile station, and, when the data is transmitted on sub-carriers distributed on all the sub-channels in the radio frame of the request signal, allocate the user data on all the sub-channels in the radio frame of the radio signal for use of the mobile station.

4. The base station according to anyone of claim 1 or 2, wherein
    the channel assignment control means set sub-carriers for transmitting a pilot signal for estimating channel state so as to be in different arrangement for each sectors, in a process for generating the sub-channel constituted by the plurality of sub-carriers sets in the radio frame, and
    the transmission means transmit a radio signal containing a radio frame in which the pilot signal is set.

5. The base station according to anyone of claim 1 or 2, wherein
    the channel assignment control means select the sub-channels by determining a selection criteria from the plurality of sub-carriers based on preliminarily assigned cell identification information, and set sub-carriers for transmitting a pilot signal for estimating channel state so as to be in different arrangement for each of the cell identification information; and
    the transmission means transmit a radio signal containing a radio frame in which the pilot signal is set.

6. A mobile station which receives a radio signal between itself and a wireless base station by means of OFDMA, comprising:
    reception means for receiving a radio signal containing a radio frame composed of sub-channels assigned each of a plurality of sets of sub-carriers selected among a plurality of sub-carriers dispersed on a frequency axis, from the wireless base station; and
    channel assignment analysis means for taking out control data regarding setting of user data in the radio frame and the orthogonal frequency division multiplexed user data, from the radio frame,
wherein,
    the channel assignment analysis means is constituted so as to divide the radio frame into 2 zones for the control and user data, divide all sub-channels in the zone for the control data into groups for each sectors of the wireless base station, to take the control data out from the groups corresponding to the mobile station, and to take the user data out from all the sub-channels in the zone for the user data.

7. The mobile station according to claim 6, further comprising:

channel assignment control means for setting uplink data on a region differing from those of the control data and the user data set by the wireless base station in the radio frame; and transmission means for transmitting a radio signal containing the radio frame on the region;

wherein, the channel assignment control means set sub-carriers for transmitting a pilot signal of which object is to estimate channel state so as to be in different arrangement for each of the sectors specified by the control data; and the transmission means transmit a radio signal containing the radio frame on the region where the pilot signal is set.

8. A radio communication system, comprising the wireless base station according to claim 1 and the mobile station according to claim 6.

9. A radio communication method in which a wireless base station transmits a radio signal between itself and a plurality of mobile stations by means of OFDMA, comprising:

a multiplexing step where multiplexing means generate orthogonal frequency division multiplexed user data;

a channel assignment control step where channel assignment control means select a plurality sets of sub-carriers among a plurality of sub-carriers dispersed on a frequency domain so as to constitute a radio frame containing sub-channels assigned for each of the plurality sets of sub-carriers, and set the user data and control data regarding setting of the user data in the radio frame by means of orthogonal frequency division multiplexing, in the radio frame; and a transmission step where transmission means transmits a radio signal containing the radio frame;

wherein, in the channel assignment control step, the radio frame is divided into 2 zones for the control and user data, and all the sub-channels in the zone for the control data are divided into groups for each of sectors of the radio signal, the control data is allocated on the corresponding divided groups, and the user data is allocated on all the sub-channels in the zone for the user data.

10. A radio communication method in which a wireless base station and a mobile station transmit and receives a radio signal by means of OFDMA, comprising:

a multiplexing step where the wireless base station generates orthogonal frequency division multiplexed user data;

a channel assignment control step where the wireless base station selects a plurality sets of sub-carriers among a plurality of sub-carriers dispersed on a frequency domain so as to constitute a radio frame containing sub-channels assigned for each of the plurality sets of sub-carriers, and set the user data and control data regarding to setting of the user data in the radio frame by means of orthogonal frequency division multiplexing, in the radio frame;

a transmission step where the wireless base station transmits a radio signal containing the radio frame;

a reception step where the mobile station receives the radio signal from the wireless base station; and a channel assignment analysis step where the mobile station takes out control data regarding setting of user data in the radio frame and the orthogonal frequency division multiplexed user data, from the radio frame;

wherein, in the channel assignment control step, the radio frame is divided into 2 zones for the control and user data, and all the sub-channels in the zone for the control data are divided into groups for each of sectors of the radio signal, the control data is allocated on the corresponding divided groups, and the user data is allocated on all the sub-channels in the zone for the user data; and in the channel assignment analysis step, the control data is taken out from the areas corresponding to the mobile station, and the user data is taken out from all the sub-channels in the radio frame.

* * * * *